United States Patent [19]

Souza, Jr.

[11] Patent Number: 4,714,369
[45] Date of Patent: Dec. 22, 1987

[54] RAIL CONNECTOR

[76] Inventor: Thomas Souza, Jr., 145 Hekili St., Kailua, Hi. 96734

[21] Appl. No.: 943,706

[22] Filed: Dec. 19, 1986

[51] Int. Cl.⁴ .............................................. F16B 7/00
[52] U.S. Cl. .................................... 403/190; 403/297
[58] Field of Search ......................... 403/190, 191, 297

[56] References Cited

U.S. PATENT DOCUMENTS

| 4,344,719 | 8/1982 | Thom | 403/297 |
| 4,540,307 | 9/1985 | Hollaender et al. | 403/190 |

FOREIGN PATENT DOCUMENTS 7811946  6/1980  Netherlands ........................ 403/297

Primary Examiner—Andrew V. Kundrat
Attorney, Agent, or Firm—Larson and Taylor

[57] ABSTRACT

A rail connector for use in connecting pipe rails to pipe posts includes a circular tubular member with a reduced sleeve which fits inside a pipe rail and substantially conforms to the inner surface of the pipe rail to provide a tight fit between the connector and the pipe rail. Also disclosed is a mechanism for adjusting the diameter of the sleeve to provide tight fit and a mechanism for locking the pipe rail on the connector so that the pipe rail cannot be removed.

17 Claims, 4 Drawing Figures

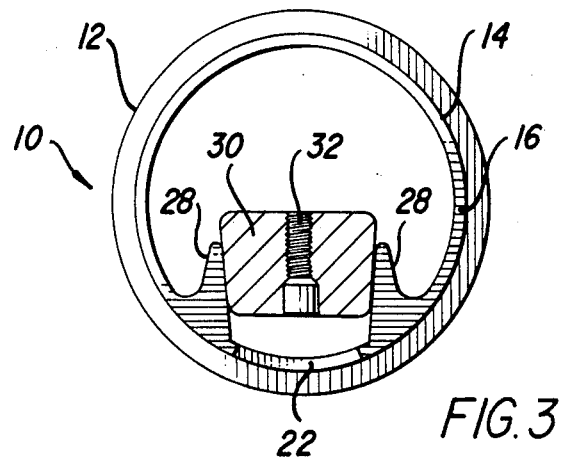
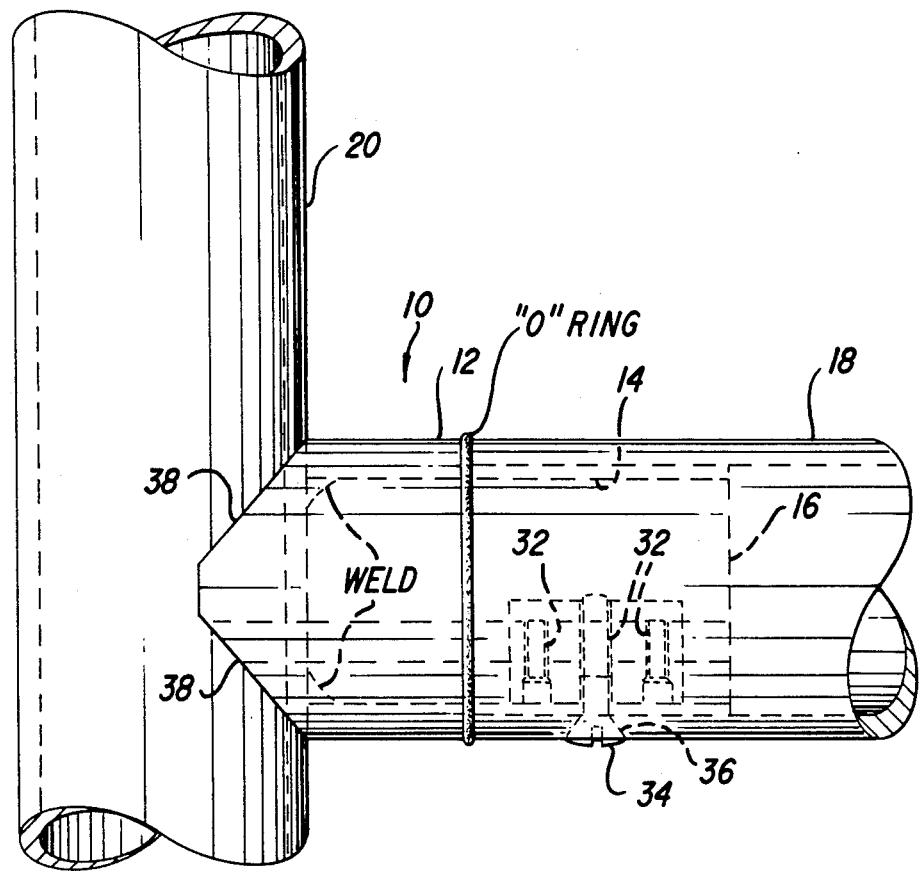

RAIL CONNECTOR

FIELD OF THE INVENTION

This invention relates to connectors for connecting pipe rails to pipe posts and the like in pipe railing construction.

BACKGROUND OF THE INVENTION

Pipe railing is an extremely popular product. It is used on public as well as private projects throughout the United States. Places such as water treatment plants, computer platforms, loading docks, sidewalks, bicycle paths, amusement areas, shopping centers, hospitals and grandstands employ pipe railing for various purposes.

Prior art pipe railings exist but they all have serious deficiencies. The installation of the prior art railings usually poses serious problems which create unnecessary expense for the consumer. In addition, certain existing connectors suffer from inadequate strength, and poor fitting of parts. These and other problems motivated the research which eventually led to the present invention.

Essentially there are two very popular designs for post and rail connectors presently in existence. The first design employs a sleeve coupling which is, in essence, a short length of pipe having an outer diameter just slightly less than than inner diameter of the pipe rail. One half of this sleeve coupling is then inserted into a horizontal pipe section of a post assembly and welded to the inner surface of this horizontal pipe section. The remaining half of the sleeve protrudes from the horizontal pipe section of the post assembly. The pipe rail is then slipped over this protruding section of the sleeve and fastened thereto by either epoxy or screws.

This particular connector is common throughout the industry and is advantageous because it allows the pipe railing to be shipped in a knock-down configuration. However, this approach requires that there be a difference in diameter between the sleeve and the inner surface of the pipe rail so that the sleeve may be slipped over the pipe rail. This produces a loose fit between the pipe rail and connector which makes the connector act in a manner similar to a universal joint during installation. This makes alignment and installation very difficult and time consuming especially when longer lengths of pipe rail are employed. Even short lengths of pipe cause significant alignment problems. These problems result in a high cost of erection and a finished product of dubious quality.

A second approach for post and rail connectors involves the use of a stainless steel sheet metal connector having enough flexibility to yield to the inner diameter of the pipe rail. This type of connector eliminates the problem of having a loose fit between the pipe rail and the connector. On the other hand this connector suffers from other significant disadvantages. For intance, the short length and inherent flexibility of the stainless steel connectors cause a significant reduction in strength at the connection. Also, alignment is still a problem because the shortness of the protrusion into the pipe rail still allows the connection to function in a manner similar to a universal joint. Finally, the fabrication of this stainless steel connector requires a significant amount of machine operations to facilitate the connection.

SUMMARY OF THE INVENTION

The present invention relates to a post and rail connector of the type wherein the internal sleeve area of the rail connector is machined as a monolithic part of the connector to conform to the inner surface of a rail.

The sleeve has a generally longitudinal slot therein which allows the sleeve to expand and contract in order to conform to the inner surfaces of rails of varying diameters. The monolithic sleeve member is attached by a suitable means to a post and the sleeve includes a means for adjusting the diameter of the sleeve by applying force to the edges of the longitudinal slot.

A preferred embodiment of the present invention includes a means for adjusting the diameter of the sleeve. This adjusting means includes a pair of fins which are located on respective sides of the slot and which protrude toward the interior of the sleeve. A wedge member is located between the fins such that positional radial adjustment of the wedge member relative to the fins changes the width of the longitudinal slot and thereby adjusts the diameter of the sleeve.

A feature of the preferred embodiment of the present invention is a means for locking the rail to the sleeve. This is accomplished by tapering the width of the longitudinal slot such that it is narrowed at the end of the sleeve and gets wider as it proceeds away from the end. The slot is adapted to be wide enough to admit the wedge member away from the end of the sleeve and narrow enough at the end of the sleeve to prevent the wedge member from fitting therein. When the wedge member is moved to adjust the diameter of the sleeve, it fits partially down into the longitudinal slot being slightly tilted inwardly at the sleeve end and out of the slot. Then, if the rail to which the wedge member is attached is pulled away from the sleeve, the rail cannot be removed from the sleeve since the wedge member is prevented from moving by the narrowing of the longitudinal slot.

It is the primary object of the present invention to provide a post and rail connector which will maintain the alignment of the pipe rail during installation while preventing separation of the parts.

Is is also an object of the present invention to provide a post and rail connector which creates a strong connection between a pipe rail and a post.

It is a further object of the present invention to provide a post and rail connector that is easy to install, inexpensive, and simple to manufacture.

It is still a further object of the present invention to provide a post and rail connector that includes a locking mechanism for retaining the rail on the connector.

These and other objects of the present invention will be apparent from the discussion which follows.

BRIEF DESCRIPTION OF THE DRAWINGS

FIG. 3 is a front elevation view of the post and rail connector depicted in FIG. 1.

FIG. 4 is a side elevation view of the post and rail connector depicted in FIG. 1 joining a post and rail.

DETAILED DESCRIPTION OF THE PREFERRED EMBODIMENTS

Figure 1:
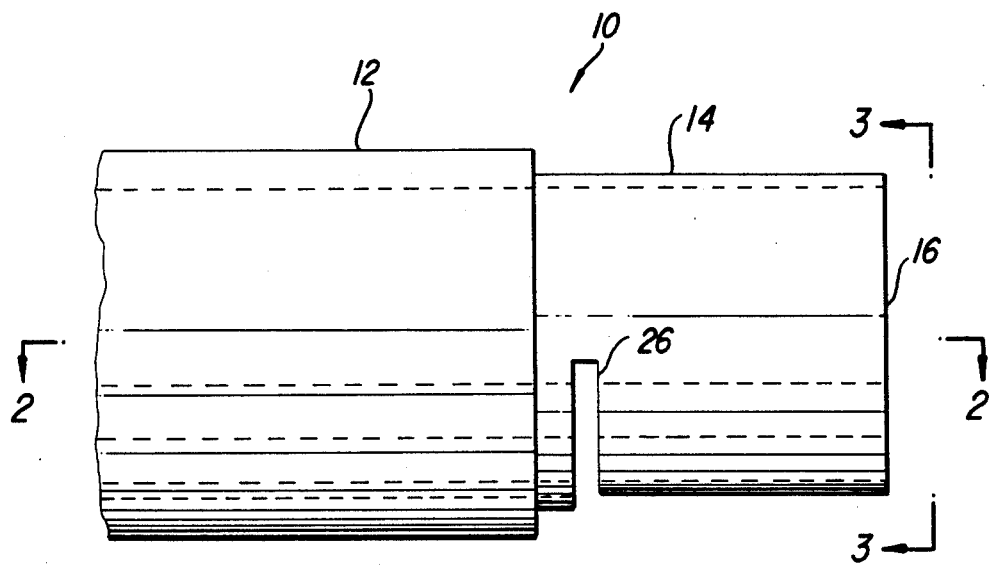
FIG. 1 is a side elevation view of the post and rail connector of the present invention.

With reference now to the drawings in which like numerals represent like elements throughout the several views, a post and rail connector 10 is shown in FIGS. 1-4. Post and rail connector 10 includes an elongate tubular member 12 having a reduced sleeve 14 at a distal end 16 thereof. As shown in FIG. 4, post and rail connector 10 is used to connect a rail 18 to a post 20.

Figure 2:
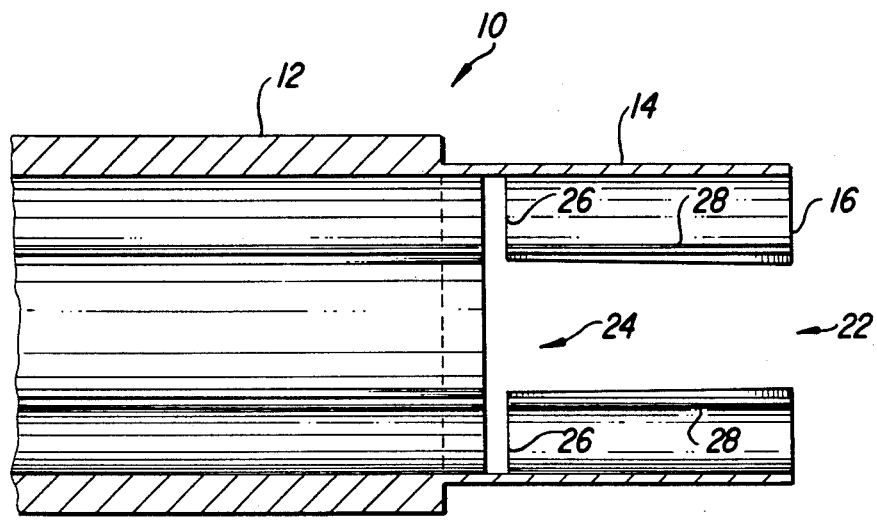
FIG. 2 is a cross-sectional top view of the post and rail connector depicted in FIG. 1 as viewed along line 2—2 in FIG. 1.

As shown best in FIG. 2, sleeve 14 includes a longitudinal slot 22 which tapers from distal end 16 of sleeve 14 to a wider width at a proximal end 24 of slot 22. Longitudinal slot 22 is designed to allow the walls of sleeve 14 to radially expand and contract to vary the diameter of sleeve 14. This is made possible as a tubular member 12 is made from a suitable thin material such as thinned aluminum extrusion. Thus, a spring fit is provided between sleeve 14 and rail 18 when sleeve 14 is received within rail 18.

Sleeve 14 also preferably includes a pair of circumferential slots 26 on either side of longitudinal slot 22 at proximal end 24. Circumferential slots 26 provide additional flexibility for sleeve 14 along the entire length of longitudinal slot 22.

As shown best in FIG. 3, tubular member 12 includes a pair of fins 28 which protrude inwardly adjacent the opposed edges of longitudinal slot 22 towards the interior of sleeve 14. Located between fins 28 is a wedge member 30. Wedge member 30 is depicted in FIG. 3 prior to adjustment of the diameter of sleeve 14. Wedge member 30 is preferably a solid block which is tapered as shown and which has a plurality of threaded apertures 32 which are adapted to threadably receive a screw 34 whose head engages a mating aperture 36 provided in rail 18.

Fins 28 are preferably angled to mate with the sides of wedge member 30. However, it should be appreciated that fins 28 could be vertical instead. Thus, as screw 34 is turned, screw 34 serves as an adjusting means for adjusting the position of wedge 30 between fins 28. The drawing of wedge member 30 into fins 28 towards longitudinal slot 22 causes the diameter of sleeve 14 to increase. Reverse movement of wedge member 30 allows the diameter of sleeve 14 to be further reduced, and hence to easily fit within rail 18 during assembly.

By providing longtudinal slot 22 with a tapering from distal end 16 to proximal end 24, a locking means is provided for holding rail 18 to post and rail connector 10. This occurs because the tapering of longitudinal slot 22 causes wedge member 30 to tilt slightly with the end of wedge member 30 adjacent proximal end 24 tilted downwards slighly into longitudinal slot 22 more than the end of wedge member 30 adjacent distal end 16. Thus, any movement of rail 18 tending to pull wedge member 30 away from tubular member 12 causes wedge member 30 to further engage the tapering provided by longitudinal slot 22 and to become more firmly wedged in place.

By way of example, when joining a rail 18 such as a schedule 40 rail, tubular member 12 is produced from schedule 80 tubing to have a sleeve 14 with an outside diameter of 1.610 inches. The length of sleeve 14 is preferably 1.750 inches. At distal end 16, longitudinal slot 22 is preferably 0.625 inches wide, whereas at the proximal end 24 longtitudinal slot is preferably 0.628 inches wide.

Post and rail connector 10 may take the form of several different embodiments besides that depicted in FIG. 4. For example, tubular member 12 can be provided with a sleeve 14 at both ends in order to connect two rails. Similarly, tubular member 12 can be located at the top of a post rather than the side of a post as depicted in FIG. 4.

In order to attach tubular member 12 to a post, tubular member 12 is preferably attached at the end thereof by welds 38. However, it should be appreciated that tubular member 12 could also be epoxied. Similarly, tubular member 12 could be attached to a pipe post by mechanical fasteners or the like. It should also be appreciated that if the spring holding force of sleeve is sufficient, the use of screw 34 and wedge member 30 can be omitted if pull out is not a consideration. If this is done, it may also be desirable to epoxy sleeve 14 to rail 18.

The preferred materials to be used for fabrication of post and rail connector 10 is a flexible metal such as aluminum. Preferably, wedge member 30 is a block of plastic.

The length of sleeve 14 in combination with the tight fit of sleeve 14 within rail 18 and the use of a locking means provides a very strong and stable connection between pipe posts and pipe rails. This connection does not behave as a universal joint during the installation of the rails in the manner of the prior art connections discussed above. In addition, the simplicity of connector 10, which requires only a single screw or other device to affect connection, reduces the cost of installation and fabrication of connectors 10. It should also be appreciated that connector 10 can be formed by casting which gives a connector similar to the drawings, with longitudinal slot 22 and circumferential slots 22 and 26 included.

In operation, after attachment of tubular member 12 to post 20 by welds 38, wedge block 30 is loosely assembled to rail 18 with screw 34. Rail 18 is then inserted over sleeve 14. At this time, wedge member 30 which will locate between fins 28 allows for screw 34 to be drawn snug, thus expanding sleeve 14 tightly against rail 18, thus making a self-aligned and self-locking connection. Fins 28 are caused to separate and to expand the diameter of sleeve 14 into a strong friction fit within the interior of rail 18. As sleeve 14 tightly engages rail 18, wedge member 30 is tilted slightly to form a lock means in sleeve 14. Post and rail connector 10 then functions as a suitable connector for as long as desired. If it is desired to remove railing 18, it should also be appreciated that the withdrawing of screw 34 from wedge member 30 allows the easy removal of rail 18 from connector 10. Use of other screw type or rivet connectors can prevent this removal if desired.

Although the present invention has been described with respect to exemplary embodiments thereof, it will be understood by those of ordinary skill in the art that variations and modifications can be effected within the scope and spirit of the invention.

I claim:

1. A rail connector for connecting a rail to a post or the like comprising:

an elongate circular tubular member including a reduced sleeve at one end thereof which is adapted to substantially conform to an inner surface of the rail, said sleeve having a generally longitudinal slot therein which allows said sleeve to expand and contract in order to conform to the inner surfaces of rails of varying diameters;

an adjusting means for adjusting the diameter of said sleeve by applying force to said sleeve along the edges of said longitudinal slot whereby the rail is held to said sleeve; and a mounting means for mounting said adjusting means to the rail prior to the insertion of said sleeve into the rail with said adjusting means in alignment with said longitudinal slot.

2. A rail connector as claimed in claim 1 wherein said adjusting means comprises:
   a wedge member adapted to fit between said fins, and
   a means for adjusting the position of said wedge member relative to said fins in order to adjust the width of said longitudinal slot and thereby adjust the diameter of said sleeve.

3. A rail connector as claimed in claim 1 wherein said adjusting means comprises:
   a wedge member adapted to fit between said fins having tapered sides which taper towards said longitudinal slot and which are adapted to engage with said fins, and
   a means for adjusting the position of said wedge member relative to said fins wherein said wedge member is moveable towards said longitudinal slot in order to increase the width of said longitudinal slot and away from said longitudinal slot in order to decrease the width of said longitudinal slot thereby adjusting the diameter of said sleeve.

4. A rail connector as claimed in claim 1 wherein said adjusting means comprises:
   a wedge member adapted to fit between said fins, and
   a means for adjusting the position of said wedge member relative to said fins in a manner wherein said wedge member is moveable towards said longitudinal slot in order to increase the width of said longitudinal slot thereby adjusting the diameter of said sleeve; and
   wherein said fins taper away from each other.

5. A rail connector as claimed in claim 3 wherein said wedge member includes a threaded aperture therein and wherein said adjusting means for adjusting said wedge member comprises a screw inserted through the rail and engaging said threaded aperture in said wedge member.

6. A rail connector as claimed in claim 3 wherein said sleeve further comprises at least one circumferential slot located at a distal end of said longitudinal slot away from the one end of said tubular member and extending circumferentially on one side of said longitudinal slot away from said longitudinal slot.

7. A rail connector as claimed in claim 6 wherein said sleeve further comprises a second circumferential slot located at the distal end of said longitudinal slot and extending circumferentially on the other side of said longitudinal slot away from said longitudinal slot and said first-mentioned circumferential slot.

8. A rail connector as claimed in claim 2 and further comprising a lock means for locking said wedge member in said longitudinal slot in order to prevent the rail from being pulled off of said sleeve.

9. A rail connector as claimed in claim 2 wherein said longitudinal slot has a width narrower than a narrowest width of said wedge member at a proximal end of said sleeve such that said wedge member cannot be pulled out of said sleeve once said wedge member is engaged in said longitudinal slot thereby preventing removal of the rail from said sleeve.

10. A rail connector as claimed in claim 1 wherein said sleeve further comprises a pair of fins located on respective sides of said longitudinal slot and protruding towards the interior of said sleeve.

11. A rail connector for connecting a rail to a post or the like comprising:
    an elongate circular tubular member including a reduced sleeve at one end thereof which is adapted to substantially conform to an inner surface of a rail, said sleeve having a generally longitudinal slot therein which allows said sleeve to expand and contract in order to conform to the inner surfaces of rails of varying diameters;
    an adjusting means for adjusting the diameter of said sleeve by applying force to said sleeve along the edges of said longitudinal slot whereby a surrounding rail is held to said sleeve; and
    a means defined by the slot for locking said adjusting means in longitudinal slot in order to prevent the rail from being pulled off said sleeve.

12. A rail connector as claimed in claim 11 wherein said sleeve further comprises a pair of fins located on respective sides of said longitudinal slot and protruding towards the interior of said sleeve.

13. A rail connector as claimed in claim 12 wherein said adjusting means comprises:
    a wedge member located between said fins having tapered sides which taper towards said longitudinal slot and which are in contact with said fins; and
    a means for adjusting the position of said wedge member relative to said fins wherein said wedge member is moveable towards said longitudinal slot in order to increase the width of said longitudinal slot and away from said longitudinal slot in order to decrease the width of said longitudinal slot thereby adjusting the diameter of said sleeve.

14. A rail connector as claimed in claim 13 wherein said sleeve further comprises at least one circumferential slot located at a distal end of said longitudinal slot away from the one end of said tubular member and extending circumferentially on one side of said longitudinal slot away from said longitudinal slot.

15. A rail connector as claimed in claim 13 wherein said longitudinal slot has a width narrower than a narrowest width of said adjusting means at a proximal end of said sleeve such that said adjusting means cannot be pulled out of said sleeve once said adjusting means is engaged in the said longitudinal slot thereby preventing removal of the rail from said sleeve.

16. A rail connector as claimed in claim 15 wherein said sleeve further comprises at least one circumferential slot located at a distal end of said longitudinal slot away from the one end of said tubular member and extending circumferentially on one side of said longitudinal slot away from said longitudinal slot.

17. A rail connector as claimed in claim 16 wherein said sleeve further comprises a second circumferential slot located at the distal end of said longitudinal slot and extending circumferentially on the other side of said longitudinal slot away from said longitudinal slot and said first-mentioned circumferential slot.

* * * * *